US009838701B2

(12) United States Patent
Liu et al.

(10) Patent No.: US 9,838,701 B2
(45) Date of Patent: Dec. 5, 2017

(54) METHOD AND VIDEO DECODER FOR DECODING SCALABLE VIDEO STREAM USING INTER-LAYER RACING SCHEME

(75) Inventors: Tsu-Ming Liu, Hsinchu (TW); Yung-Chang Chang, New Taipei (TW); Chi-Cheng Ju, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 756 days.

(21) Appl. No.: 14/235,801

(22) PCT Filed: Aug. 3, 2011

(86) PCT No.: PCT/CN2011/077967
§ 371 (c)(1),
(2), (4) Date: Jan. 29, 2014

(87) PCT Pub. No.: WO2013/016871
PCT Pub. Date: Feb. 7, 2013

(65) Prior Publication Data
US 2014/0169466 A1    Jun. 19, 2014

(51) Int. Cl.
*H04N 19/31* (2014.01)
*H04N 19/423* (2014.01)
(Continued)

(52) U.S. Cl.
CPC .......... *H04N 19/31* (2014.11); *H04N 19/423* (2014.11); *H04N 19/426* (2014.11); *H04N 19/44* (2014.11); *H04N 19/593* (2014.11); *H04N 19/33* (2014.11)

(58) Field of Classification Search
CPC ........ H04N 19/42; H04N 19/30; H04N 19/44; H04N 19/33; H04N 19/34; H04N 19/426;
(Continued)

(56) References Cited

U.S. PATENT DOCUMENTS

| 6,697,426 B1* | 2/2004 | Van Der Schaar .... H04N 19/61 375/240.01 |
| 2003/0156637 A1* | 8/2003 | Van Der Schaar .. H04N 19/176 375/240.01 |

(Continued)

FOREIGN PATENT DOCUMENTS

| CN | 101742324 A | 6/2010 |
| CN | 101828401 A | 9/2010 |
| CN | 102013255 A | 4/2011 |

OTHER PUBLICATIONS

T.C. Chen, Y.W. Huang, & L.G. Chen, "Analysis and Design of Macroblock Pipelining for H.264/AVC VLSI Architecture", 2 Proceedings of the 2004 Int'l Symposium on Circuits & Systems (ISCAS '04) 273-276 (May 2004).*

(Continued)

*Primary Examiner* — David N Werner
(74) *Attorney, Agent, or Firm* — Winston Hsu (57) ABSTRACT

One exemplary method for decoding a scalable video stream, including a base layer frame and at least an enhancement layer frame corresponding to the base layer frame, has the following steps: decoding the base layer frame; and before the base layer frame is fully decoded, decoding the enhancement layer frame. Another exemplary method for decoding a scalable video stream, including a base layer frame and at least an enhancement layer frame corresponding to the base layer frame, has the following steps: decoding the enhancement layer frame, and decoding the base layer frame; wherein a start point of decoding the enhancement layer frame is earlier than a start point of decoding the base layer frame.

12 Claims, 10 Drawing Sheets

(51) Int. Cl.
　　*H04N 19/426*　　(2014.01)
　　*H04N 19/44*　　(2014.01)
　　*H04N 19/593*　　(2014.01)
　　*H04N 19/33*　　(2014.01)
(58) Field of Classification Search
　　CPC .... H04N 19/43; H04N 19/433; H04N 19/187; H04N 19/31
　　See application file for complete search history.

(56) References Cited

U.S. PATENT DOCUMENTS

| | | | | |
|---|---|---|---|---|
| 2004/0179619 | A1* | 9/2004 | Tian | H04N 21/23406 375/240.26 |
| 2006/0072597 | A1* | 4/2006 | Hannuksela | H04N 21/23406 370/412 |
| 2007/0091997 | A1* | 4/2007 | Fogg | H04N 19/56 375/240.1 |
| 2007/0092008 | A1* | 4/2007 | Chang | H04N 19/139 375/240.16 |
| 2007/0230573 | A1* | 10/2007 | Iguchi | H04N 19/51 375/240.12 |
| 2011/0099330 | A1* | 4/2011 | Guo | H04N 7/014 711/114 |
| 2012/0183059 | A1* | 7/2012 | Nishi | H04N 19/31 375/240.12 |

OTHER PUBLICATIONS

"International Search Report" dated May 17, 2012 for International application No. PCT/CN2011/077967, International filing date:Aug. 3, 2011.

* cited by examiner

METHOD AND VIDEO DECODER FOR DECODING SCALABLE VIDEO STREAM USING INTER-LAYER RACING SCHEME

TECHNICAL FIELD

The disclosed embodiments of the present invention relate to decoding a scalable video stream, and more particularly, to a method for decoding a scalable video stream (e.g., an H.264/SVC stream) using an inter-layer racing scheme and related video decoder thereof.

BACKGROUND

Advances in video coding technology and standardization along with the rapid developments and improvements of network infrastructures, storage capacity, and computing power enable an increased number of video applications nowadays. The video transmission systems using the Internet and mobile communication networks are for real-time services characterized by a wide range of connection qualities and receiving devices. For example, the receiving devices with different capabilities may range from cell phones with small display screens and restricted computing power to high-end personal computers with high-definition display apparatuses and powerful computing power. Regarding the problems encountered by the characteristics of the above-mentioned video transmission systems, scalable video coding (SVC) may be a highly attractive solution for video frame transmission.

SVC is an extension of the H.264/AVC standard and standardizes the encoding of a high-quality video bitstream that also contains one or more subset bitstreams. The subset bitstream can represent a lower spatial resolution (smaller screen), lower temporal resolution (lower frame rate), or a lower video quality compared to the bitstream it is derived from. For example, the spatial scalability over H.264/SVC may allow 8 layers for different spatial resolutions at most. Besides, the inter-layer dependency may be exploited for improving the coding efficiency. Preferably, a low-resolution layer (e.g., a base layer) is referenced by a high-resolution layer (e.g., an enhancement layer) when the high-resolution layer is being coded at a video encoder. Therefore, inter-layer intra prediction, inter-layer residual prediction, and/or inter-layer motion prediction may be employed by the video encoder for generating coded enhancement layer frames.

Regarding the decoding flow performed at a video decoder, the conventional design fully decodes a base layer frame to generate a complete decoding result, store the complete decoding result into an external memory, and decoding an enhancement layer frame by reading information provided by the complete decoding result stored in the external memory. However, such a conventional design of decoding an enhancement layer frame requires a large storage capacity for buffering a complete decoding result of a base layer frame and a large bandwidth for accessing an external memory.

SUMMARY

In accordance with exemplary embodiments of the present invention, a method for decoding a scalable video stream (e.g., an H.264/SVC stream) using an inter-layer racing scheme and related video decoder thereof are proposed to solve the above-mentioned problem.

According to a first aspect of the present invention, an exemplary method for decoding a scalable video stream including a base layer frame and at least an enhancement layer frame corresponding to the base layer frame is disclosed. The exemplary method includes: decoding the base layer frame; and before the base layer frame is fully decoded, decoding the enhancement layer frame.

According to a second aspect of the present invention, an exemplary method for decoding a scalable video stream including a base layer frame and at least an enhancement layer frame corresponding to the base layer frame is disclosed. The exemplary method includes: decoding the enhancement layer frame, and decoding the base layer frame, wherein a start point of decoding the enhancement layer frame is earlier than a start point of decoding the base layer frame.

According to a third aspect of the present invention, an exemplary video decoder for decoding a scalable video stream including a base layer frame and at least an enhancement layer frame corresponding to the base layer frame is disclosed. The exemplary video decoder includes a base layer decoding circuit arranged for decoding the base layer frame; and an enhancement layer decoding circuit arranged for decoding the enhancement layer frame before the base layer frame is fully decoded by the base layer decoding circuit.

According to a fourth aspect of the present invention, an exemplary video decoder for decoding a scalable video stream including a base layer frame and at least an enhancement layer frame corresponding to the base layer frame is disclosed. The exemplary video decoder includes: an enhancement layer decoding circuit arranged for decoding the enhancement layer frame; and a base layer decoding circuit arranged for decoding the base layer frame. The enhancement layer decoding circuit starts decoding the enhancement layer frame before the base layer decoding circuit starts decoding the base layer frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The conception of the present invention is to use an inter-layer racing scheme for relaxing the capacity requirement and/or the bandwidth requirement of an external storage device (e.g., an external memory). The proposed inter-layer racing scheme includes a base layer racing mode in which a base layer races first and an enhancement layer racing mode in which an enhancement layer races first. In a case where a video decoder employs the base layer racing mode for decoding a scalable video stream, the size of an external storage device used for buffering decoded data generated from decoding a base layer frame can be reduced while the bandwidth needed for accessing the external storage device remains unchanged. In another case where a video decoder employs the enhancement layer racing mode for decoding a scalable video stream, the bandwidth needed for accessing an external storage device can be reduced at an expense of the size of the external storage device; however, the size of the external storage device used for buffering decoded data generated from decoding a base layer frame is still smaller than that of a conventional external memory used for buffering a complete decoding result generated from fully decoding the base layer frame. To put it simply, a video decoder (e.g., an H.264/SVC decoder) may employ the proposed inter-layer racing scheme, either the base layer racing mode or the enhancement layer racing mode, to have lower production cost as well as lower power consumption, and is suitable for a variety of applications such as a portable multimedia player, a mobile phone, etc. Further details of the proposed inter-layer racing scheme are described as below.

Figure 1:
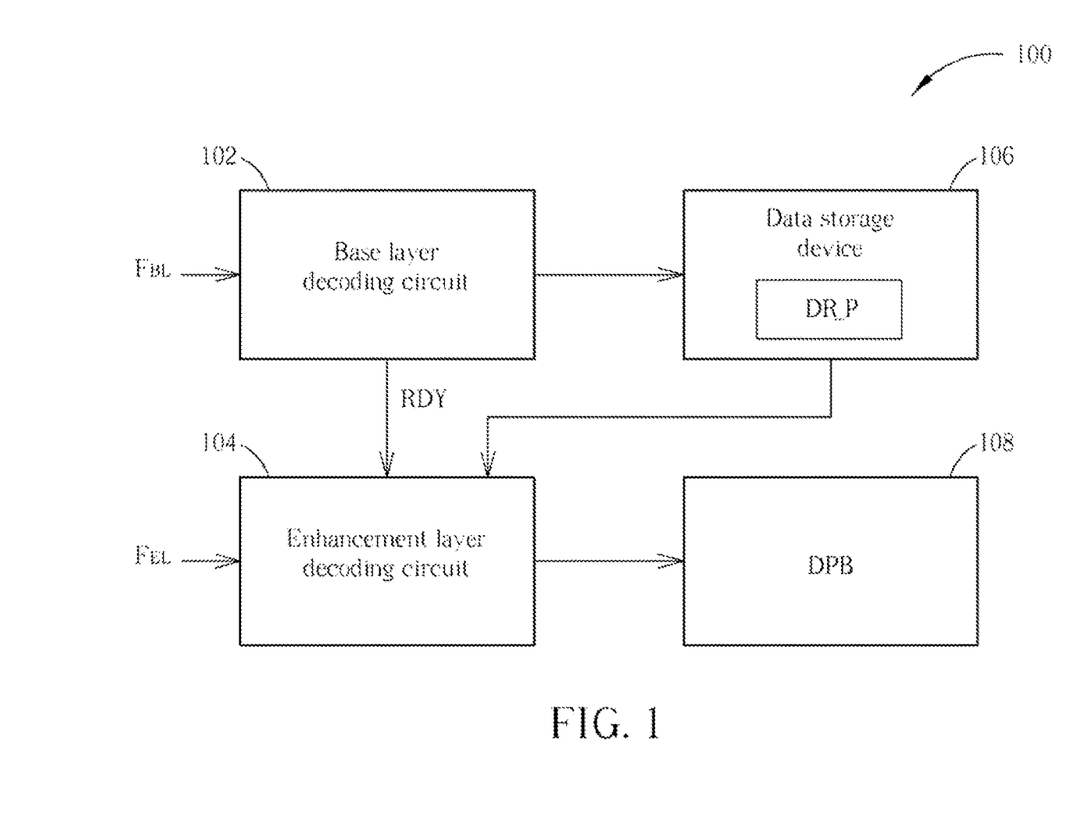
FIG. 1 is a block diagram illustrating a video decoder employing a base layer racing mode according to an exemplary embodiment of the present invention.

Please refer to FIG. 1, which is a block diagram illustrating a video decoder employing a base layer racing mode according to an exemplary embodiment of the present invention. The exemplary video decoder 100 is used for decoding a scalable video stream (e.g., an H.264/SVC stream), including a plurality of frames such as a base layer frame $F_{BL}$ and at least an enhancement layer frame $F_{EL}$ corresponding to the base layer frame $F_{BL}$. Please note that the base layer frame $F_{BL}$ is decoded for low-resolution video playback, and the enhancement layer frame $F_{EL}$ is decoded for high-resolution video playback (i.e., the spatial scalability in H.264/SVC standard). As shown in FIG. 1, the exemplary video decoder 100 includes, but is not limited to, a base layer decoding circuit 102, an enhancement layer decoding circuit 104, a data storage device 106 acting as a line buffer, and a decoded picture buffer (DPB) 108. The base layer decoding circuit 102 is arranged for decoding the base layer frame $F_{BL}$. The enhancement layer decoding circuit 104 is arranged for decoding the enhancement layer frame $F_{EL}$ before the base layer frame $F_{BL}$ is fully decoded by the base layer decoding circuit 102, which implies that the enhancement layer decoding circuit 104 is allowed to start decoding the enhancement layer frame $F_{EL}$ without waiting for the end of decoding process of the base layer frame $F_{BL}$.

If a video encoder (not shown) generates the enhancement layer frame $F_{EL}$ by using an inter-layer prediction, such as an inter-layer intra prediction, an inter-layer residual prediction, and/or an inter-layer motion prediction, the decoding of the enhancement layer frame $F_{EL}$ depends on the decoding of the base layer frame $F_{BL}$ acting as a reference frame. In contrast to the conventional design which stores a complete decoding result generated from fully decoding a base layer frame into an external memory, the base layer decoding circuit 102 decodes a portion of the base layer frame $F_{BL}$ to generate a partial decoding result DR_P, and stores the partial decoding result DR_P into the data storage device 106. In this exemplary embodiment, the enhancement layer decoding circuit 104 is capable of correctly decoding macroblocks in the enhancement layer frame $F_{EL}$ by referring to the partial decoding result DR_P available in the data storage device 106, thereby allowing the enhancement layer decoding circuit 104 to decode the enhancement layer frame $F_{EL}$ before the base layer frame $F_{BL}$ is fully decoded by the base layer decoding circuit 102. For example, the decoding of the enhancement layer frame $F_{EL}$ is controlled by a one-way handshaking mechanism between the base layer decoding circuit 102 and the enhancement layer decoding circuit 104. Specifically, when the required decoded data of the base layer frame $F_{BL}$ is available in the data storage device 106, a ready signal RDY is sent to notify the enhancement layer decoding circuit 104.

As mentioned above, the data storage device 106 is allowed to buffer the partial decoding result DR_P rather than a complete decoding result of the base layer frame $F_{BL}$. This is based on inventors' observation derived from examining a reference C-Model of the H.264/SVC standard. More specifically, it is found that the relation between a position of a needed data of the base layer frame and a position of a data of the enhancement layer frame that is to be decoded can be expressed by the following equation:

$$B = \text{Round}\left(\frac{E \times D + R}{2^{S-4}}\right) \quad \text{Equation (1)}$$

In above equation (1), Round ( ) is a round function that returns a rounded number, parameter B represents the position of the needed data of the base layer frame, parameter E represents the position of the data of the enhancement layer frame that is to be decoded, parameter D represents a ratio of a size of the data of the enhancement layer frame that is to be decoded to a size of the needed data of the base layer frame, and parameter R represents a position offset. Moreover, the parameter S represents the precision control for better compromise between quality and computational cost. Regarding a macroblock-level (MB-level) pipeline-based decoding structure, the base layer frame would be accessed in a linear manner. Hence, parameters D and R are both constant values. The aforementioned equation (1) can be rewritten as below:

$$B = a \times E + b, \text{ where } a \text{ and } b \text{ are constant values} \quad \text{Equation (2)}$$

In other words, the position of the needed data of the base layer frame and the position of the data of the enhancement layer frame that is to be decoded has a linear relation. Therefore, accessing of decoded data of the base layer frame can be predicted and is limited within a partial data range smaller than a full data range encompassing the whole decoding result of the base layer frame.

Figure 2:
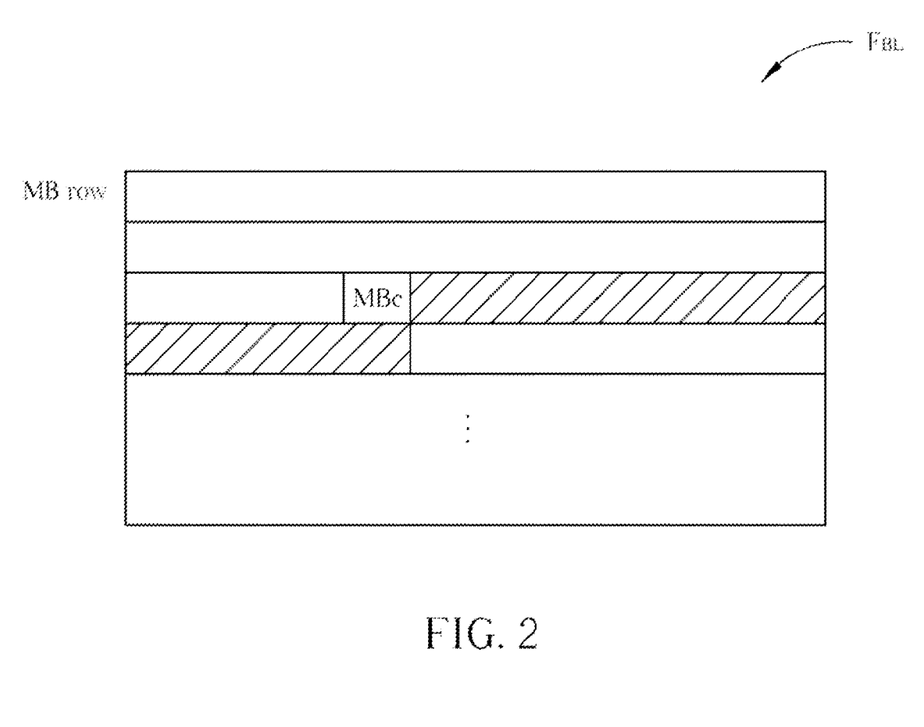
FIG. 2 is a diagram illustrating the decoding of a current macroblock within the base layer frame.
Figure 3:
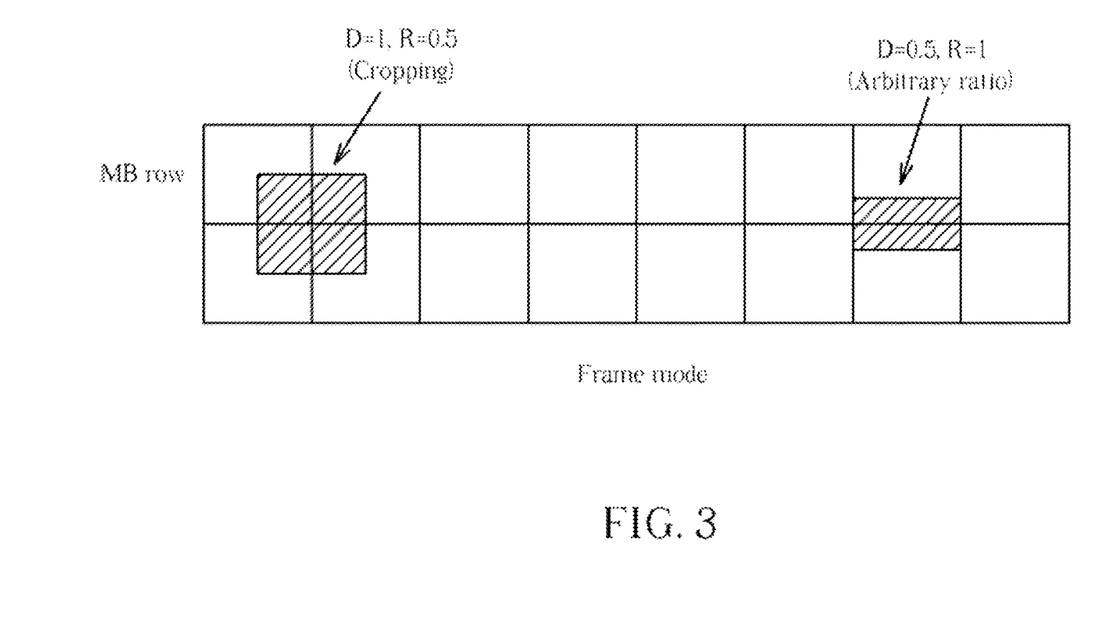
FIG. 3 is a diagram illustrating a reference layer macroblock with D=1 and R=0.5 under a frame mode supporting cropping and another reference layer macroblock with D=0.5 and R=1 under a frame mode supporting an arbitrary ratio mode.
Figure 4:
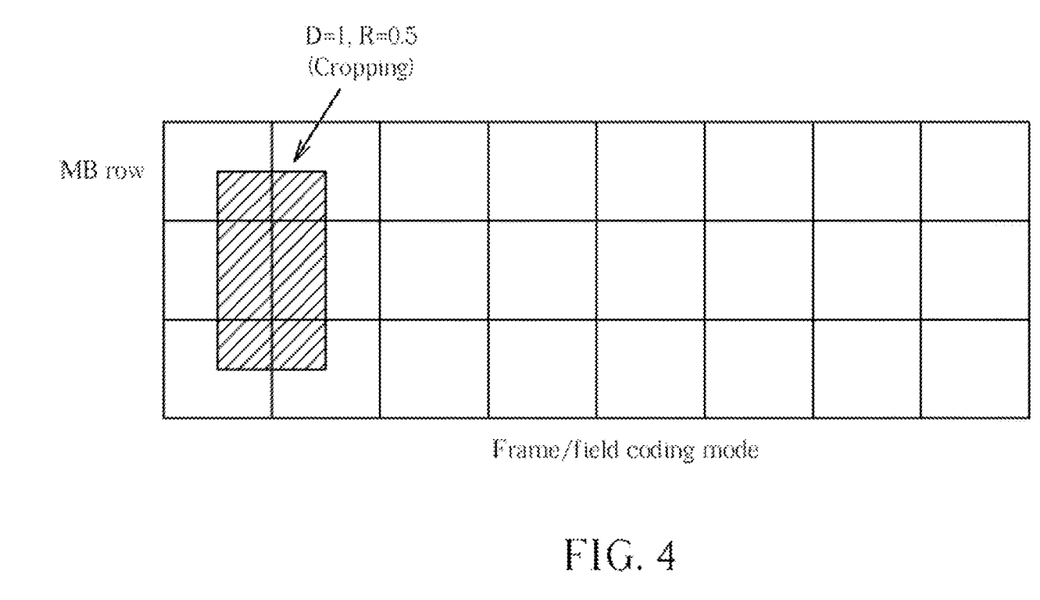
FIG. 4 is a diagram illustrating a reference layer macroblock with D=1 and R=0.5 under a frame/filed coding mode.

Please refer to FIG. 2, which is a diagram illustrating the decoding of a current macroblock within the base layer frame $F_{BL}$. In accordance with the H.264/SVC standard, the decoding result of one MB row (marked by oblique lines) immediately following the current macroblock $MB_c$ is required to obtain a correct decoding result of the current macroblock $MB_c$. Regarding an extended spatial scalability (ESS) scenario, a projected MB (i.e., a reference MB) is not on the MB-grid of the base layer frame. Please refer to FIG. 3, which is a diagram illustrating a reference MB with D=1 and R=0.5 under a frame mode supporting cropping and another reference MB with D=0.5 and R=1 under the frame mode supporting an arbitrary ratio mode. As shown in the figure, each reference MB includes a first part belonging to one MB row, and a second part belonging to another MB row. Therefore, the decoding result of two MB rows should be buffered under such an operational condition. Please refer to FIG. 4, which is a diagram illustrating a reference MB with D=1 and R=0.5 under a frame/filed coding mode. As shown in the figure, the reference MB includes a first part belonging to one MB row, a second part belonging to another MB row, and a third part belonging to yet another MB row. Therefore, the decoding result of three MB rows should be buffered under such an operational condition. Hence, to meet all decoding requirements of different operational conditions, a data size of the partial decoding result DR_P is preferably equal to a data size of three MB rows. However, this is for illustrative purposes only, and is not meant to be a limitation of the present invention. The spirit of the present invention is obeyed as long as the capacity/size of the data storage device 106 is configured to be smaller than a data size of a complete decoding result of the base layer frame.

By way of example, but not limitation, the partial decoding result derived from decoding a portion of the base layer frame $F_{BL}$ may include reconstructed samples, residual values, motion vectors, etc. Besides, when a new MB of the base layer frame is decoded, the partial decoding result DR_P stored in the data storage device 106 may be updated by storing the decoded data of the new MB into the data storage device 106 and removing the decoded data of the oldest MB from the data storage device 106. In this way, the data size of the partial decoding result DR_P is still equal to the data size of a plurality of MB rows (e.g., three MB rows) to meet the decoding requirement.

The enhancement layer decoding circuit 104 decodes MBs of the enhancement layer frame $F_{EL}$ in a raster scan order, and searches the partial decoding result DR_P stored in the data storage device 106 for needed information when the MBs are encoded using inter-layer prediction. As the position of the needed data of the base layer frame and the position of the data of the enhancement layer frame that is to be decoded has a linear relation, and the partial decoding result DR_P stored in the data storage device 106 is properly updated, the decoding result of the enhancement layer frame $F_{EL}$ is therefore correctly generated and stored into the DPB 108 for following video playback.

Figure 5:
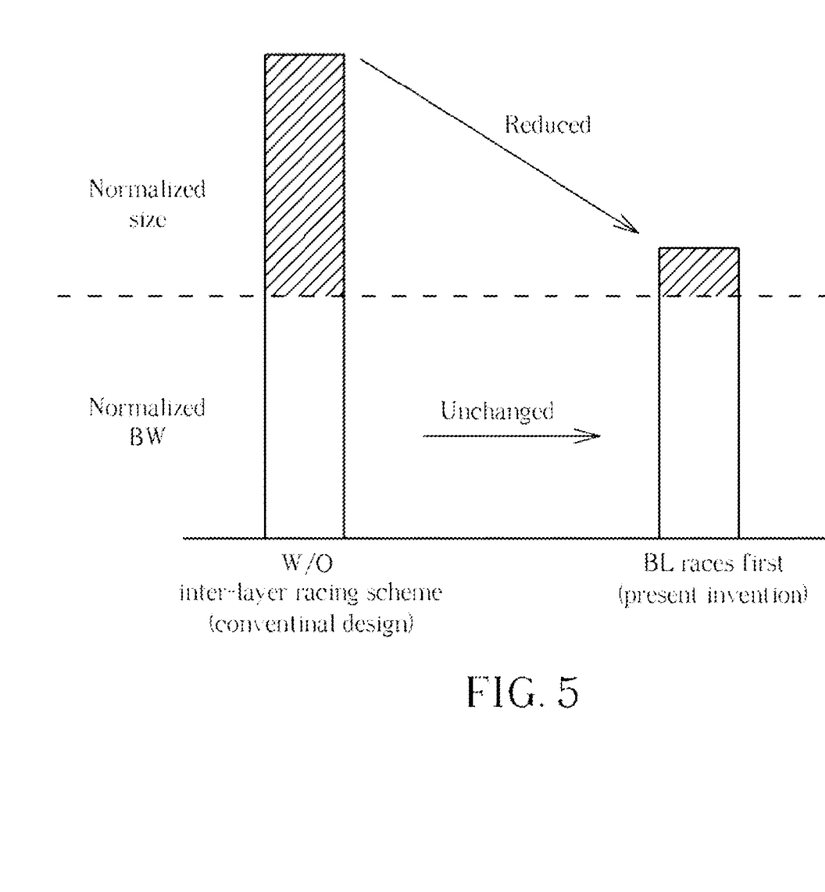
FIG. 5 is a diagram illustrating a comparison between a conventional video decoder design and a video decoder of the present invention that employs a base layer racing mode in which the base layer races first.

Please refer to FIG. 5, which is a diagram illustrating a comparison between a conventional video decoder design and a video decoder of the present invention that employs a base layer racing mode in which the base layer races first. As mentioned above, the capacity/size of the data storage device 106 is not required to be equal to a data size of a complete decoding result of the base layer frame $F_{BL}$ due to the fact that accessing of decoded data of the base layer frame is predictable and is limited within a partial data range. The capacity/size of a storage device (e.g., an external memory) needed for buffering decoded data of a base layer frame can be reduced. In this way, the hardware cost of the storage device is reduced accordingly. It should be noted that, as the partial decoding result DR_P stored in the data storage device 106 will be updated, the decoded data of all MBs included in the base layer frame $F_{BL}$ will be sequentially generated to the data storage device 106 by the base layer decoding circuit 102. In other words, the bandwidth needed for accessing the storage device (e.g., an external memory) 106 remains unchanged.

Figure 6:
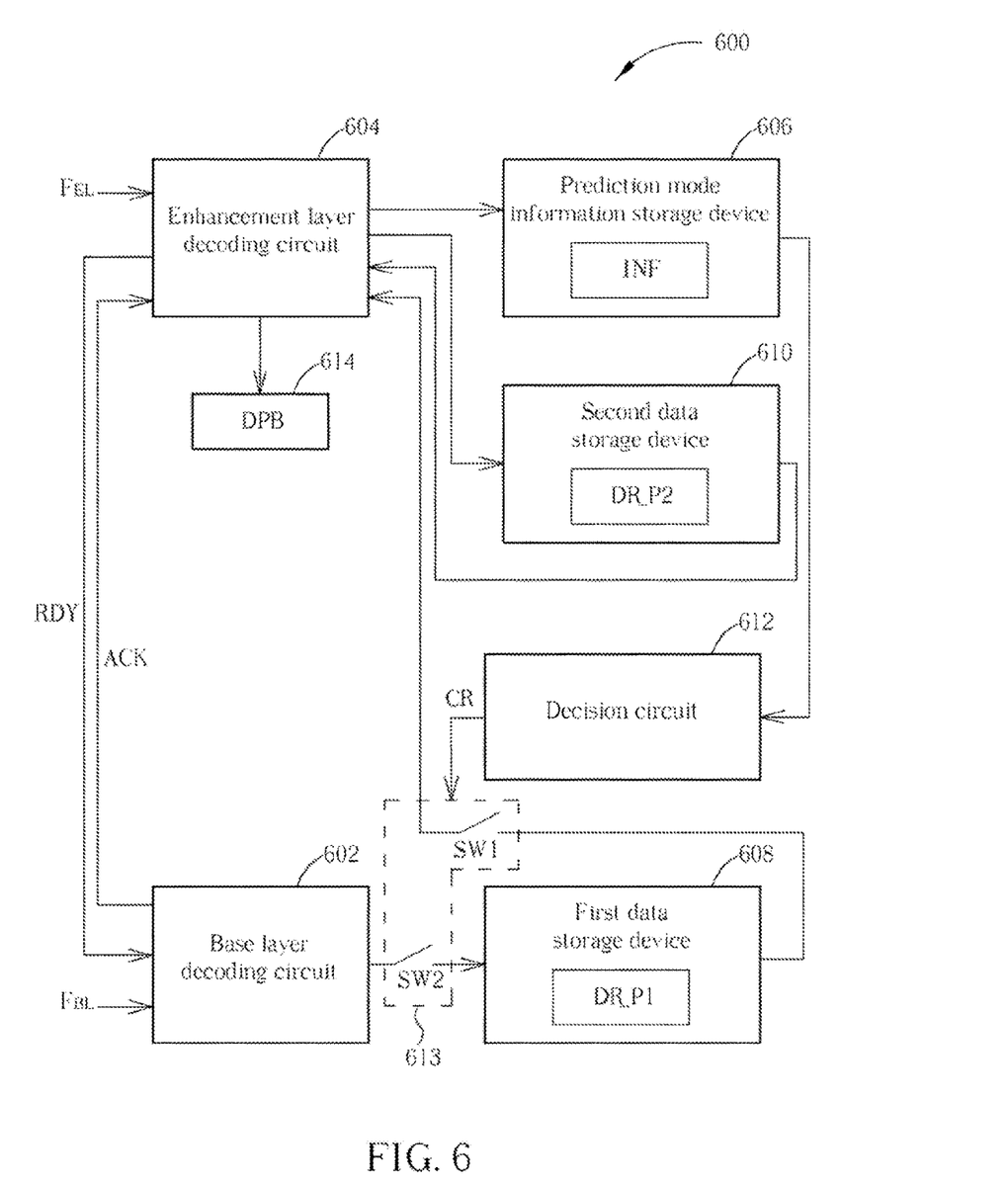
FIG. 6 is a block diagram illustrating a video decoder employing an enhancement layer racing mode according to an exemplary embodiment of the present invention.

To reduce the bandwidth needed for accessing the storage device (e.g., an external memory) 106, the video decoder may be configured to employ an enhancement layer racing mode. Please refer to FIG. 6, which is a block diagram illustrating a video decoder employing an enhancement layer racing mode according to an exemplary embodiment of the present invention. The exemplary video decoder 600 is used for decoding a scalable video stream (e.g., an H.264/SVC stream), including a plurality of frames such as a base layer frame $F_{BL}$ and at least an enhancement layer frame $F_{EL}$ corresponding to the base layer frame $F_{BL}$. As shown in FIG. 6, the exemplary video decoder 600 includes, but is not limited to, a base layer decoding circuit 602, an enhancement layer decoding circuit 604, a prediction mode information storage device 606, a first data storage device 608 acting as a first line buffer, a second data storage device 610 acting as a second line buffer, a decision circuit 612, a switch module 613, and a decoded picture buffer (DPB) 614. In this exemplary embodiment, the enhancement layer decoding circuit 604 is allowed to start decoding the enhancement layer frame $F_{EL}$ before the base layer decoding circuit 602 starts decoding the base layer frame $F_{BL}$. In other words, no matter whether the inter-layer prediction is needed, the enhancement layer decoding circuit 604 may initially generate decoded data of the enhancement layer frame $F_{EL}$ at the absence of decoded data of the base layer frame $F_{BL}$. Further details are described as below.

The enhancement layer decoding circuit 604 is arranged for parsing the enhancement layer frame $F_{EL}$ to obtain prediction mode information INF, and stores the prediction mode information INF into the prediction mode information storage device 606. The decision circuit 612 is coupled to the prediction mode information storage device 606, and arranged for checking if an inter-layer prediction is needed by referring to the prediction mode information INF and accordingly generating a checking result CR. In this exemplary embodiment, the checking result CR also acts a switch control signal of the switch module 613 having a first switch SW1 and a second switch SW2. For example, when the checking result CR indicates that the inter-layer prediction is needed (e.g., CR=1), the first switch SW1 and the second switch SW2 are both switched on for connecting the first data storage device 608 to the base layer decoding circuit 602 and the enhancement layer decoding circuit 604. However, when the checking result CR indicates that the inter-layer prediction is not needed (e.g., CR=0), the first switch SW1 and the second switch SW2 are both switched off for disconnecting the first data storage device 608 from the base layer decoding circuit 602 and the enhancement layer decoding circuit 604. However, using the switch module 613 to control the data transmission is for illustrative purposes only. That is, the switch module 613 is an optional element and may be omitted in another exemplary embodiment. For example, the decision circuit 612 may outputs the checking result CR to both of the base layer decoding circuit 602 and the enhancement layer decoding circuit 604. Under the control of the checking result CR, the base layer decoding circuit 602 selectively outputs the decoded data to the first data storage device 608, and the enhancement layer decoding circuit 604 selectively retrieves needed data from the first data storage device 608. The same objective of controlling data access of the first data storage device 608 is achieved.

Figure 7:
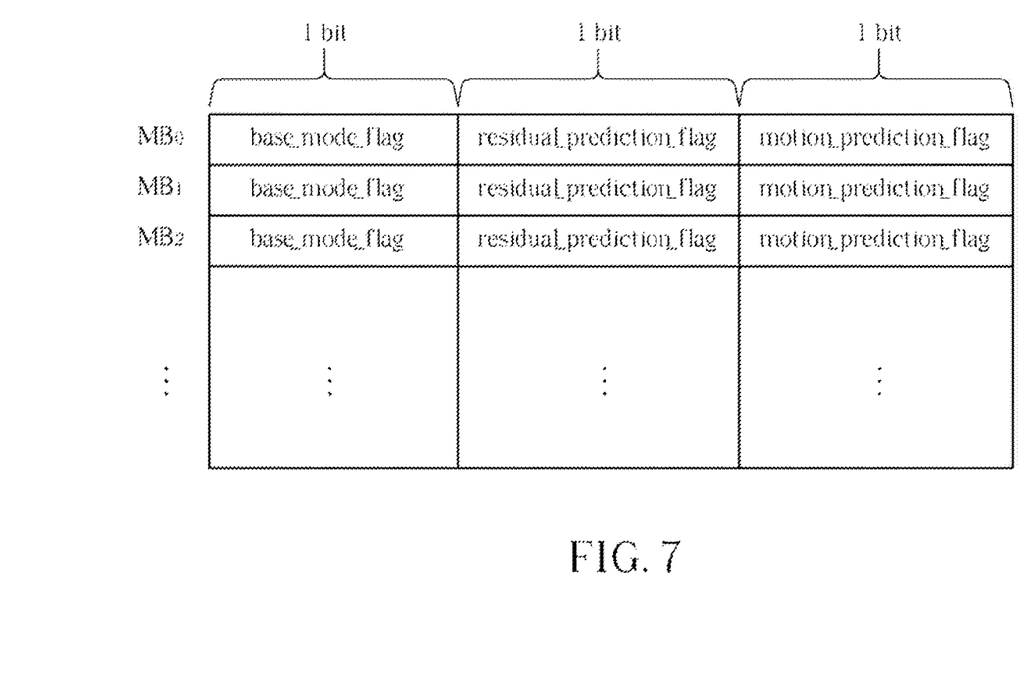
FIG. 7 is a diagram illustrating an exemplary storage arrangement of syntax elements in the prediction mode information storage device shown in FIG. 6.

By way of example, but not limitation, the prediction mode information INF includes first macroblock-level syntax elements base_mode_flag, second macroblock-level syntax elements residual_prediction_flag, and third macroblock-level syntax elements motion_prediction_flag of a plurality of MBs included in the enhancement layer frame $F_{EL}$. In this exemplary embodiment, the base layer decoding circuit 602 is arranged for decoding a portion of the base layer frame $F_{BL}$ to generate a first partial decoding result DR_P1, and the enhancement layer decoding circuit 604 is arranged for decoding a portion of the enhancement layer frame $F_{EL}$ to generate a second partial decoding result DR_P2, wherein a data size of the second partial decoding result DR_P2 is smaller than a data size of the first partial decoding result DR_P1. For example, the second data storage device 610 may be configured to store decoded data of one MB row, and the first data storage device 608 may be configured to store decoded data of three MB rows. Thus, the decision circuit 612 is an MB-row based processing circuit. To avoid the data dependency conflict, the first macroblock-level syntax element base_mode_flag, second macroblock-level syntax element residual_prediction_flag, and third macroblock-level syntax element motion_prediction_flag of each MB is stored into the prediction mode information storage device 606 before the inter-layer prediction is checked by the decision circuit 612. As shown in FIG. 7, 3-bit prediction mode information of each MB that includes the aforementioned first macroblock-level syntax element base_mode_flag, second macroblock-level syntax element residual_prediction_flag, and third macroblock-level syntax element motion_prediction_flag is stored in the prediction mode information storage device 606.

In this exemplary embodiment, the decision circuit 612 is an MB-row based processing circuit which checks the first macroblock-level syntax elements base_mode_flag, second macroblock-level syntax elements residual_prediction_flag, and third macroblock-level syntax elements motion_prediction_flag of a plurality of MBs corresponding to one MB row for determining one checking result CR. For example, the decision circuit 612 generates the checking result CR indicating that the inter-layer prediction is needed (e.g., CR=1) when the first macroblock-level syntax elements base_mode_flag indicate that the inter-layer intra prediction is used, the second macroblock-level syntax elements residual_prediction_flag indicates that the inter-layer residual prediction is used, or the third macroblock-level syntax elements motion_prediction_flag indicate that the inter-layer motion prediction is used; and generates the checking result CR indicating that the inter-layer prediction is not needed (e.g., CR=0) when the first macroblock-level syntax elements base_mode_flag indicate that the inter-layer intra prediction is not used, the second macroblock-level syntax elements residual_prediction_flag indicate that the inter-layer residual prediction is not used, and the third macroblock-level syntax elements motion_prediction_flag indicate that the inter-layer motion prediction is not used. More specifically, when at least one of the first macroblock-level syntax elements base_mode_flag of one MB row indicates that the inter-layer intra prediction is used (i.e., base_mode_flag=1), at least one of the second macroblock-level syntax elements residual_prediction_flag of one MB row indicates that the inter-layer residual prediction is used (i.e., residual_prediction_flag=1), or at least one of the third macroblock-level syntax elements motion_prediction_flag indicates that the inter-layer motion prediction is used (i.e., motion_prediction_flag=1), the checking result CR is set to indicate that the inter-layer prediction is needed; otherwise, the checking result CR is set to indicate that the inter-layer prediction is not needed.

It should be noted that, the dependency between decoding of the enhancement layer frame $F_{EL}$ and decoding of the base layer frame $F_{BL}$ may be controlled by a two-way handshaking mechanism between the enhancement layer decoding circuit 604 and the base layer decoding circuit 602, wherein the two-way handshaking mechanism includes a ready signal RDY generated from the enhancement layer decoding circuit 604 to the base layer decoding circuit 602, and an acknowledgement signal ACK generated from the base layer decoding circuit 602 to the enhancement layer decoding circuit 604. For example, when the needed prediction mode information INF is ready in the prediction mode information storage device 606 and the second partial decoding result DR_P2 is ready in the second data storage device 610, the enhancement layer decoding circuit 604 sends the ready signal RDY to notify the base layer decoding circuit 602. When notified by the ready signal RDY, the base layer decoding circuit 602 starts decoding the portion of the base layer frame $F_{BL}$ to generate the first partial decoding result DR_P1. When the first partial decoding result DR_P1 is obtained by the base layer decoding circuit 602, the base layer decoding circuit 602 sends the acknowledgement signal ACK to notify the enhancement layer decoding circuit 604. In this way, the decoding sequence of the enhancement layer and the base layer is properly controlled by the two-way handshaking mechanism.

When the checking result CR indicates that the inter-layer prediction is needed (i.e., CR=1), the first switch SW1 and the second switch SW2 are both switched on, thereby making the decoding operation of the enhancement layer decoding circuit 604 identical to that of the enhancement layer decoding circuit 104 shown in FIG. 1. That is, when the checking result CR indicates that inter-layer prediction is needed by decoding of the portion of the enhancement layer frame $F_{EL}$, the enhancement layer decoding circuit 604 outputs a final decoding result of the portion of the enhancement layer frame $F_{EL}$ to the DPB 614 trough refining the second partial decoding result DR_P2 read from the second data storage device 610 according to the first partial decoding result DR_P1 read from the first data storage device 608, wherein the first partial decoding result DR_P1 provides information needed by the inter-layer prediction.

When the checking result CR indicates that the inter-layer prediction is not needed (i.e., CR=0), the first switch SW1 and the second switch SW2 are both switched off, thereby terminating/skipping writing of data generated from the base layer decoding circuit 602 and reading of data stored in the first data storage device 608. That is, when the checking result CR indicates that inter-layer prediction is not needed by decoding of the portion of the enhancement layer frame $F_{EL}$, the enhancement layer decoding circuit 604 outputs the final decoding result of the portion of the enhancement layer frame $F_{EL}$ by directly reading the second partial decoding result DR_P2 from the second data storage device 610 due to the fact that the second partial decoding result DR_P2 requires no further refinement provided by inter-layer prediction.

Figure 8:
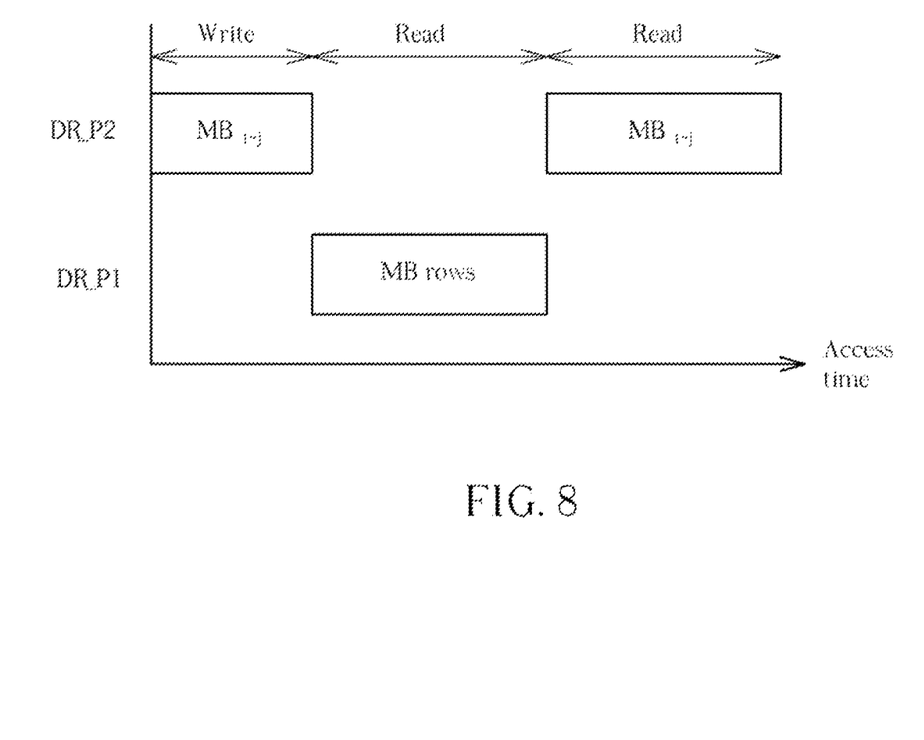
FIG. 8 is a diagram illustrating an access behavior of the first data storage and the second data storage device when the inter-layer prediction is needed.
Figure 9:
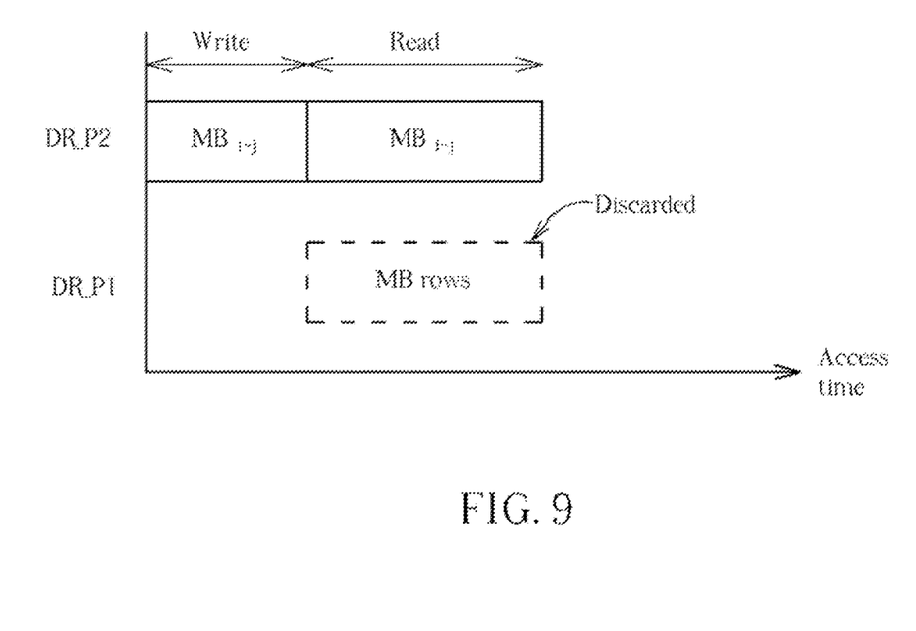
FIG. 9 is a diagram illustrating an access behavior of the first data storage and the second data storage device when the inter-layer prediction is not needed.
Figure 10:
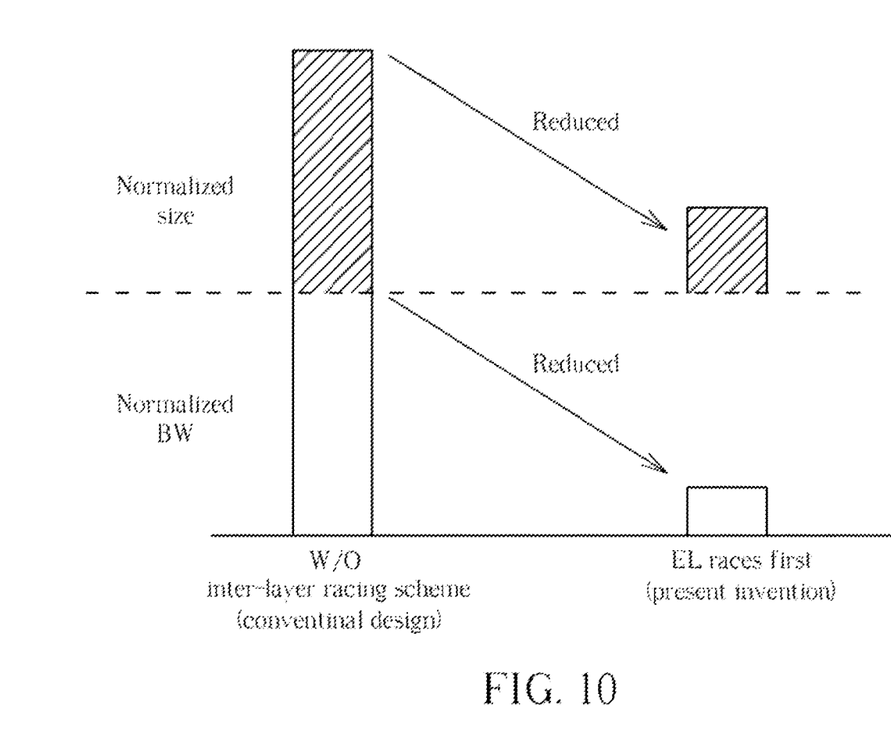
FIG. 10 is a diagram illustrating a comparison between a conventional video decoder design and a video decoder of the present invention that employs an enhancement layer racing mode in which the enhancement layer races first.

Please refer to FIG. 8 in conjunction with FIG. 9. FIG. 8 is a diagram illustrating an access behavior of the first data storage 608 and the second data storage device 610 when the inter-layer prediction is needed. FIG. 9 is a diagram illustrating an access behavior of the first data storage 608 and the second data storage device 610 when the inter-layer prediction is not needed. As the data access of the first data storage device 608 is temporarily stopped due to the checking result CR indicating that inter-layer prediction based on a decoding result of a plurality of MB rows (e.g., three MB rows) is not needed by decoding of a portion of the enhancement layer frame $F_{EL}$ that includes a plurality of macroblocks $MB_{i-j}$, the time required for accessing the first data storage device 608 is therefore reduced In addition to the access time, the bandwidth required for accessing the first data storage device 608 is reduced. Please refer to FIG. 10, which is a diagram illustrating a comparison between a conventional video decoder design and a video decoder of the present invention that employs an enhancement layer racing mode in which the enhancement layer races first. As mentioned above, the capacity/size of the first data storage device 608 is not required to be equal to a data size of a complete decoding result of the base layer frame $F_{BL}$ due to the fact that accessing of decoded data of the base layer frame is predictable and is limited within a partial data range. The capacity of a storage device (e.g., an external memory) needed for buffering decoded data of a base layer frame can be reduced. Moreover, when the decision circuit 612 judges that the inter-layer prediction (e.g., the inter-layer intra prediction, the inter-layer residual prediction, and/or the inter-layer motion prediction) is not needed, the data access of the first data storage device 608 is terminated/skipped. Hence, the overall bandwidth required for accessing the first data storage device 608 is also reduced.

Compared to the exemplary video decoder design shown in FIG. 2, the exemplary video decoder design shown in FIG. 6 requires additional storage devices (i.e., the prediction mode information storage device 606 and the second storage device 610). Thus, the bandwidth needed for accessing an external storage device is reduced at an expense of the size of the external storage device; however, both of the bandwidth requirement and the buffer capacity requirement of the exemplary video decoder design shown in FIG. 6 are lower than that of the conventional video decoder design.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for decoding a scalable video stream including a base layer frame and at least an enhancement layer frame corresponding to the base layer frame, comprising:
   decoding the enhancement layer frame,
   decoding the base layer frame, comprising:
   decoding a portion of the base layer frame to generate a first partial decoding result;
   when information derived from decoding the enhancement layer frame indicates that an inter-layer prediction between the base layer frame and the enhancement layer frame is not needed by decoding of a portion of the enhancement layer frame, not storing the first partial decoding result into a first data storage device; and
   when the information derived from decoding the enhancement layer frame indicates that the inter-layer prediction is needed by decoding of the portion of the enhancement layer frame, storing the first partial decoding result into the first data storage device;
   wherein a start point of decoding the enhancement layer frame is earlier than a start point of decoding the base layer frame.

2. The method of claim 1, wherein the step of decoding the enhancement layer frame comprises:
   parsing the enhancement layer frame to obtain prediction mode information;
the method further comprises:
   checking if the inter-layer prediction is needed by referring to the prediction mode information, and accordingly generating a checking result;
   wherein the first partial decoding result is selectively stored into the first data storage device according to the checking result.

3. The method of claim 2, wherein the step of decoding the enhancement layer frame further comprises:
   decoding the portion of the enhancement layer frame to generate a second partial decoding result; and
   storing the second partial decoding result into a second data storage device;
   when the checking result indicates that inter-layer prediction is needed by decoding of the portion of the enhancement layer frame, outputting a final decoding result of the portion of the enhancement layer frame by refining the second partial decoding result read from the second data storage device according to the first partial decoding result read from the first data storage device; and
   when the checking result indicates that the inter-layer prediction is not needed by decoding of the portion of the enhancement layer frame, outputting the final decoding result of the portion of the enhancement layer frame by directly reading the second partial decoding result from the second data storage device.

4. The method of claim 3, wherein a data size of the second partial decoding result is smaller than a data size of the first partial decoding result.

5. The method of claim 4, wherein the data size of the first partial decoding result is equal to a data size of a plurality of rows of macroblocks.

6. The method of claim 2, wherein the prediction mode information includes first macroblock-level syntax elements, second macroblock-level syntax elements, and third macroblock-level syntax elements of a plurality of macroblocks; and the step of checking if the inter-layer prediction is needed comprises:
   generating the checking result indicating that the inter-layer prediction is needed when the first macroblock-level syntax elements indicate that an inter-layer intra prediction is used, the second macroblock-level syntax elements indicate that an inter-layer residual prediction is used, or the third macroblock-level syntax element indicate that an inter-layer motion prediction is used; and generating the checking result indicating that the inter-layer prediction is not needed when the first macroblock-level syntax elements indicate that the inter-layer intra prediction is not used, the second macroblock-level syntax elements indicate that the inter-layer residual prediction is not used, and the third macroblock-level syntax elements indicate that the inter-layer motion prediction is not used.

7. A video decoder for decoding a scalable video stream including a base layer frame and at least an enhancement layer frame corresponding to the base layer frame, comprising:

a first data storage device;

an enhancement layer decoding circuit, arranged for decoding the enhancement layer frame; and a base layer decoding circuit, arranged for decoding the base layer frame, comprising:

decoding a portion of the base layer frame to generate a first partial decoding result;

wherein when information derived from decoding the enhancement layer frame indicates that an inter-layer prediction between the base layer frame and the enhancement layer frame is not needed by decoding of a portion of the enhancement layer frame, the base layer decoding circuit does not store the first partial decoding result into the first data storage device; and when the information derived from decoding the enhancement layer frame indicates that the inter-layer prediction is needed by decoding of the portion of the enhancement layer frame, the base layer decoding circuit stores the first partial decoding result into the first data storage device;

wherein the enhancement layer decoding circuit starts decoding the enhancement layer frame before the base layer decoding circuit starts decoding the base layer frame.

8. The video decoder of claim 7, wherein the enhancement layer decoding circuit is arranged for parsing the enhancement layer frame to obtain prediction mode information; and the video decoder further comprises:

a prediction mode information storage device, arranged for buffering the prediction mode information; and a decision circuit, coupled to the prediction mode information storage device, the decision circuit arranged for checking if the inter-layer prediction is needed by referring to the prediction mode information, and accordingly generating a checking result; wherein the first partial decoding result is selectively stored into the first data storage device according to the checking result.

9. The video decoder of claim 8, further comprising: a second data storage device, coupled to the enhancement layer decoding circuit; wherein the enhancement layer decoding circuit is arranged for decoding the portion of the enhancement layer frame to generate a second partial decoding result, and storing the second partial decoding result into the second data storage device; when the checking result indicates that inter-layer prediction is needed by decoding of the portion of the enhancement layer frame, outputting a final decoding result of the portion of the enhancement layer frame by refining the second partial decoding result read from the second data storage device according to the first partial decoding result read from the first data storage device; and when the checking result indicates that the inter-layer prediction is not needed by decoding of the portion of the enhancement layer frame, outputting the final decoding result of the portion of the enhancement layer frame by directly reading the second partial decoding result from the second data storage device.

10. The video decoder of claim 9, wherein a data size of the second partial decoding result is smaller than a data size of the first partial decoding result.

11. The video decoder of claim 10, wherein the data size of the first partial decoding result is equal to a data size of a plurality of rows of macroblocks.

12. The video decoder of claim 8, wherein the prediction mode information includes first macroblock-level syntax elements, second macroblock-level syntax elements, and third macroblock-level syntax elements; and the decision circuit is arranged for generating the checking result indicating that the inter-layer prediction is needed when the first macroblock-level syntax elements indicate that an inter-layer intra prediction is used, the second macroblock-level syntax elements indicate that an inter-layer residual prediction is used, or the third macroblock-level syntax elements indicate that an inter-layer motion prediction is used; and generating the checking result indicating that the inter-layer prediction is not needed when the first macroblock-level syntax elements indicate that the inter-layer intra prediction is not used, the second macroblock-level syntax elements indicate that the inter-layer residual prediction is not used, and the third macroblock-level syntax elements indicate that the inter-layer motion prediction is not used.

* * * * *